US012746521B2

(12) United States Patent
Lee et al.

(10) Patent No.: US 12,746,521 B2
(45) **Date of Patent: *Sep. 29, 2026**

(54) ULTRA-DISPERSION MIXER

(71) Applicants: SK ON CO., LTD., Seoul (KR); YUNSUNG F&C CO., LTD, Gyeonggi-do (KR)

(72) Inventors: Je Yeol Lee, Daejeon (KR); Ji Yun Yang, Daejeon (KR); Tae Soon Park, Chungcheongnam-do (KR)

(73) Assignees: SK ON CO., LTD., Seoul (KR); YUNSUNG F&CO., LTD, Gyeonggi-do (KR)

( * ) Notice: Subject to any disclaimer, the term of this patent is extended or adjusted under 35 U.S.C. 154(b) by 56 days.

This patent is subject to a terminal disclaimer.

(21) Appl. No.: 18/780,489

(22) Filed: Jul. 23, 2024

(65) Prior Publication Data

US 2024/0375068 A1 Nov. 14, 2024

Related U.S. Application Data

(63) Continuation of application No. 17/243,298, filed on Apr. 28, 2021, now Pat. No. 12,064,734.

(30) Foreign Application Priority Data

Apr. 29, 2020 (KR) ........................ 10-2020-0051937

(51) Int. Cl.
*B01F 27/84* (2022.01)
*B01F 23/53* (2022.01)
(Continued)

(52) U.S. Cl.
CPC .............. *B01F 27/84* (2022.01); *B01F 23/53* (2022.01); *B01F 27/1121* (2022.01);
(Continued)

(58) Field of Classification Search
CPC ......... B01F 27/84; B01F 27/95; B01F 27/192
See application file for complete search history.

(56) References Cited

U.S. PATENT DOCUMENTS

| | | | | |
|---|---|---|---|---|
| 6,021,707 A * | 2/2000 | Bauer | ........................ | B66F 9/19<br>99/337 |
| 2004/0008570 A1* | 1/2004 | Folestad | ............... | B01F 35/213<br>366/142 |

(Continued)

FOREIGN PATENT DOCUMENTS

| | | |
|---|---|---|
| CN | 102451638 A * | 5/2012 |
| CN | 206139111 U * | 5/2017 |

(Continued)

*Primary Examiner* — Claire X Wang
*Assistant Examiner* — Patrick M McCarty
(74) *Attorney, Agent, or Firm* — IP&T GROUP LLP

(57) ABSTRACT

Provided is an ultra-dispersion mixer, for stirring a mixed material for producing a high-quality slurry for an electrode of a secondary battery within a short time by disposing a low-speed blade and a high-speed blade for stirring a mixed material in a chamber so as to easily and effectively disperse elements of the slurry of a secondary battery, supplied to a mixer during a procedure of preparing the slurry of a secondary battery produced by performing mixing procedures multiple times, and disposing blade parts having a plurality of stirring characteristics so as to realize various stirring characteristics in the mixed material on the high-speed blade to increase the dispersion of the mixed material while the mixed material circulates in a high-shear disperser of the chamber and to simultaneously increase the temperature of a supplied solution at the beginning of stirring of the mixed material in the chamber.

12 Claims, 6 Drawing Sheets

(51) Int. Cl.

| | |
|---|---|
| ***B01F 27/1121*** | (2022.01) |
| ***B01F 27/1123*** | (2022.01) |
| ***B01F 27/113*** | (2022.01) |
| ***B01F 27/192*** | (2022.01) |
| ***B01F 27/90*** | (2022.01) |
| ***B01F 35/221*** | (2022.01) |
| ***B01F 35/30*** | (2022.01) |
| ***B01F 35/71*** | (2022.01) |
| ***B01F 35/75*** | (2022.01) |
| ***B01F 35/92*** | (2022.01) |
| *H01M 4/04* | (2006.01) |

(52) U.S. Cl.

CPC ........ *B01F 27/1123* (2022.01); *B01F 27/113* (2022.01); *B01F 27/192* (2022.01); *B01F 27/90* (2022.01); *B01F 35/22162* (2022.01); *B01F 35/30* (2022.01); *B01F 35/71805* (2022.01); *B01F 35/7547* (2022.01); *B01F 35/92* (2022.01); *H01M 4/04* (2013.01)

(56) References Cited

U.S. PATENT DOCUMENTS

| | | | | |
|---|---|---|---|---|
| 2004/0234677 | A1* | 11/2004 | Sato | H01M 4/525 366/279 |
| 2013/0135961 | A1* | 5/2013 | Wittek | B01F 27/1122 366/184 |
| 2019/0183159 | A1* | 6/2019 | Chanvrier | C08L 3/02 |
| 2021/0213403 | A1* | 7/2021 | Pyo | B01F 27/0721 |

FOREIGN PATENT DOCUMENTS

| | | | | | |
|---|---|---|---|---|---|
| CN | 108079871 | A | * | 5/2018 | B01F 27/2322 |
| DE | 2129549 | A1 | * | 2/1972 | |
| KR | 100873414 | B1 | * | 12/2008 | B28C 5/10 |
| KR | 101283910 | B1 | * | 7/2013 | B02C 18/182 |
| KR | 101844921 | B1 | * | 4/2018 | H01M 4/04 |
| PL | 193043 | B1 | * | 1/2007 | B01F 27/85 |
| WO | WO-2018113486 | A1 | * | 6/2018 | H01M 4/587 |

* cited by examiner

ULTRA-DISPERSION MIXER

CROSS-REFERENCE TO RELATED APPLICATIONS

This application is a continuation of U.S. patent application Ser. No. 17/243,298 filed on Apr. 28, 2021, which claims priority under 35 U.S.C. § 119 to Korean Patent Application No. 10-2020-0051937, filed on Apr. 29, 2020, in the Korean Intellectual Property Office, the disclosure of which is incorporated herein by reference in its entirety.

TECHNICAL FIELD

The following disclosure relates to an ultra-dispersion mixer, and more particularly to an ultra-dispersion mixer for realizing various stirring characteristics in one mixer device to easily and effectively disperse elements of a slurry for a secondary battery, supplied into a mixer during a procedure of preparing the slurry of a secondary battery produced by performing mixing procedures multiple times.

The present disclosure can be broadly applied in the field of green technology, such as electric vehicles, battery charging stations, solar power generation using batteries. The present disclosure can be used in the manufacturing of batteries used for eco-friendly electric vehicles, hybrid vehicles, etc., thus contributing to the reduction of air pollution and greenhouse gas emissions.

BACKGROUND

A slurry for a secondary battery is configured by mixing powders included in a positive electrode or a negative electrode, an adhesive (hereinafter, a binder) for fixing the powders to an electrode plate, a conductive agent for improving the electrical conductivity between the powders, and so on. When the slurry for a secondary battery is prepared, the powder, the binder powder, the conductive agent powder, and a binder solution may be put and stirred at one time, but in this case it is very difficult to stir the elements in a mixer due to aggregation, electrostatic attraction, and so on of each unit element and it is difficult to produce a slurry for a secondary battery having high marketability. Accordingly, in general, a slurry for a secondary battery is prepared by preparing a solution in advance by melting binder powders in a specific solvent, adding a positive electrode material, a negative electrode material powder, or the like to the prepared binder solution, and then stirring the resulting material. Here, when the binder solution is prepared, different binder solutions are used for a positive electrode and a negative electrode, respectively. In general, it is easy, in terms of the time and cost for preparing the slurry for a secondary battery, to sequentially perform mixing for preparing a binder solution and subsequent mixing for preparing the slurry for a secondary battery in a single mixing device. A conventional mixer device for preparing a slurry for a secondary battery is used to prepare the slurry for a secondary battery using a method of improving the dispersion of mixed materials by positioning a high-speed stirring body and a low-speed stirring body in a mixer, as disclosed in Korean Patent Publication No. 10-1737756 ("Slurry mixer for battery electrode" May 13, 2017). However, as described above, in a procedure of preparing the slurry for a secondary battery, a mixer requires stirring characteristics whereby binder powders are rapidly melted in a solution when the binder solution is and requires stirring prepared, characteristics whereby positive electrode powders or negative electrode powders, which is not dissolved in a binder solution having high viscosity, are evenly dispersed when the slurry for a secondary battery is prepared by mixing polar powders in the prepared binder solution, but the features disclosed in the cited reference have a problem in that all stirring characteristics appropriate for the procedure of preparing the slurry for a secondary battery are not satisfied. In addition, due to the recently increasing demand for battery packs of electric vehicles, there is also a problem in that the production of secondary battery slurries does not keep up with the demand, resulting in disruption in battery production. Accordingly, in order to prepare a slurry for a secondary battery, there is a need for an ultra-dispersion mixer for reducing the preparing time of the slurry for a secondary battery while maintaining high quality by containing various stirring characteristics in one mixer and effectively mixing elements of the slurry for a secondary battery.

Cited Reference

Patent Document

1. KR 10-1737756 B1 (May 13, 2017)

SUMMARY

An embodiment of the present disclosure is directed to providing an ultra-dispersion mixer for preparing a slurry for a secondary battery having high dispersion by realizing required stirring characteristics in one mixer depending on the powder and solution input during a procedure of preparing the slurry for a secondary battery, and increasing a feed rate of the slurry for a secondary battery by reducing the stirring time.

In one general aspect, an ultra-dispersion mixer includes a chamber configured to accommodate a mixed material therein, a blade drum formed as a cylinder having a space formed therein and disposed to rotate at an upper portion of an internal side of the chamber, a low-speed blade having one end connected to a lower surface of the blade drum and a remaining end that extends along an internal wall of the chamber and rotates together with the blade drum along the internal wall of the chamber, and at least one high-speed blade having one end connected to the blade drum and a remaining end that extends towards an internal side of the chamber and rotating on the blade drum, wherein the high-speed blade has a plurality of blade parts having different stirring characteristics and arranged on one shaft.

Here, the blades may include a saw blade that has a sawtooth protruding outside a circular plate and rotates, and a star blade that has a plurality of rods vertically extending outside a circular plate and rotates.

Here, the low-speed blade may include a rod portion extending along an internal surface of the chamber, a bottom portion extending along a bottom surface of the chamber, and a plurality of protrusions that protrude towards the internal side of the chamber from the rod portion and are spaced apart from each other, wherein the blade parts may be arranged between the plurality of protrusions that are spaced apart from each other.

Here, the ultra-dispersion mixer may further include a power distributor insertion-installed to penetrate an upper portion of the chamber and a center of the blade drum and configured to distribute one or more powers transferred from a plurality of power sources to the blade drum or the high-speed blade, wherein the power distributor may include a first distributor configured to distribute any one of powers transferred from the plurality of power sources to the blade drum, and a second distributor formed as a rotation shaft penetrating a center of the first distributor and configured to distribute remaining power of the powers transferred from the plurality of power sources to the high-speed blade, and the low-speed blade may rotate together with the blade drum, and the high-speed blade may rotate on the blade drum.

Furthermore, the high-speed blade may rotate at a higher speed than a revolution speed of the low-speed blade.

Here, the ultra-dispersion mixer may further include an opening and closing device connected to opposite sides of the chamber and configured to raise and lower the chamber on a support on which the chamber is disposed.

Here, the ultra-dispersion mixer may further include a powder feeder configured to supply powders to the chamber, a solution feeder configured to supply a solution to the chamber, and a heat exchanger configured to adjust a temperature of the solution supplied to the solution feeder.

Here, the ultra-dispersion mixer may further include a high-shear disperser configured to supply high-shear dispersion force to a mixed material introduced from the chamber using rotation force of an impeller included in the ultra-dispersion mixer, wherein an inlet and an outlet that are formed in a lower portion of the chamber may be connected to the high-shear disperser.

In this case, the inlet and the outlet may include timing valves formed thereon, which are opened and closed after the mixed material is stirred in the chamber during a user set time or greater.

DETAILED DESCRIPTION OF EMBODIMENTS

Hereinafter, the present disclosure will be described in detail through explaining exemplary embodiments of the present disclosure with reference to the accompanying drawings.

The accompanying drawings illustrate merely an example for more clearly understanding the features of the present disclosure and thus the features of the present disclosure should not be limited by the accompanying drawings.

Figure 1:
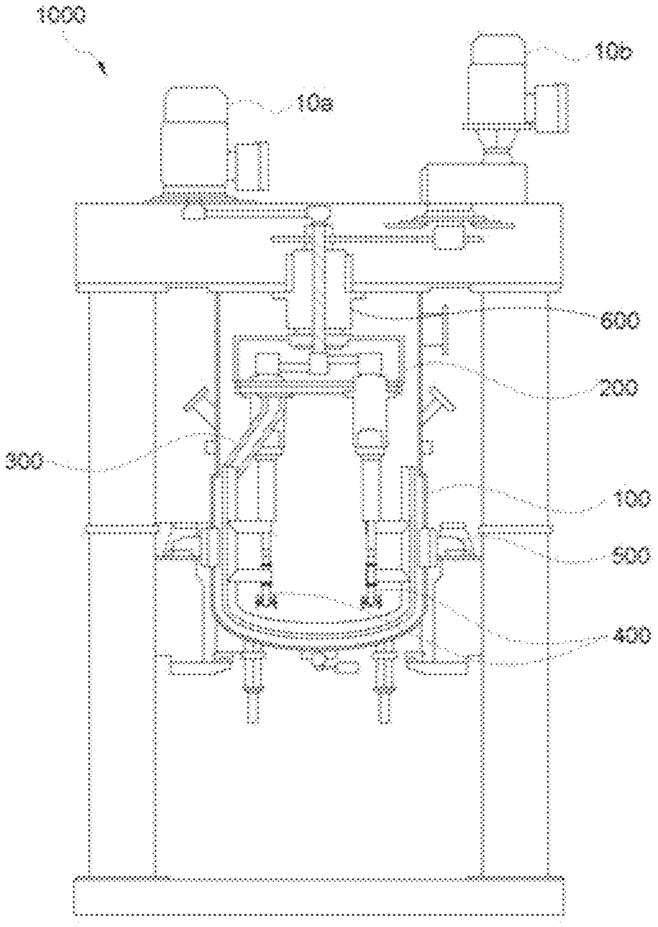
FIG. 1 is a diagram showing an ultra-dispersion mixer according to the present disclosure.

As shown in FIG. 1, an ultra-dispersion mixer 1000 according to the present disclosure may include a chamber 100, a blade drum 200, a low-speed blade 300, a high-speed blade 400, and an opening and closing device 500. The components will be described below in detail.

The chamber 100 may have a space formed therein and may accommodate a mixed material, that is, powders and a binder solution for preparing a secondary battery slurry. The chamber 100 may stir the powders and the binder solutions to form a slurry for an electrode of a secondary battery, and in some embodiments, the completely stirred slurry for an electrode of a secondary battery may be discharged by opening and closing an upper or lower portion of the chamber 100 through the opening and closing device 500 or may be moved to the outside through a discharger formed on the chamber 100 and connected to the outside.

The blade drum 200 may be disposed in an upper portion of an internal side of the chamber 100 and may perform a function of distributing at least one power transferred from the outside of the ultra-dispersion mixer 1000 to the low-speed blade 300 and the high-speed blade 400 and may perform a function of rotating in the upper portion of the internal side of the chamber 100 for an operation of the low-speed blade 300 connected to the blade drum 200.

The low-speed blade 300 may stir the mixed material agglomerated on an internal wall of the chamber 100 to the center of the chamber 100. The low-speed blade 300 may have one end connected to at least one region of the blade drum 200 and the other end that extends along the internal wall of the chamber 100. Thus, the low-speed blade 300 may be disposed adjacent to the internal wall of the chamber 100 and may be disposed to prevent from interfering with the chamber 100 while the blade drum 200 rotates. Furthermore, the low-speed blade 300 may rotate inside the chamber 100 along with rotation of the blade drum 200, and thus may have the shape for improving the stirring efficiency together with the high-speed blade 400 disposed at the blade drum 200 and the shape and arrangement for preventing from interfering with the high-speed blade 400. A detailed description of the aforementioned shape of the low-speed blade 300 and the arrangement of the low-speed blade 300 for preventing from interfering with the high-speed blade 400 will be given with reference to FIG. 2.

The high-speed blade 400 may be disposed on the blade drum 200 and may shaft-rotate at high speed, and thereby may stir the mixed material accommodated in the chamber 100 to supply dispersion force to agglomerated particles of the accommodated mixed material and to tear each particle using a plurality of blade parts having different stirring characteristics and arranged on one shaft of the high-speed blade 400. A detailed description of the blade parts having different stirring characteristics and an arrangement method of the high-speed blade 400 will be given below with reference to FIGS. 2, 3A, and 3B.

The opening and closing device 500 may be disposed at opposite sides of the chamber 100 and may perform a function of rotating the chamber 100 and a function of raising and lowering the chamber 100 on a support on which the chamber 100 is disposed.

Figure 2:
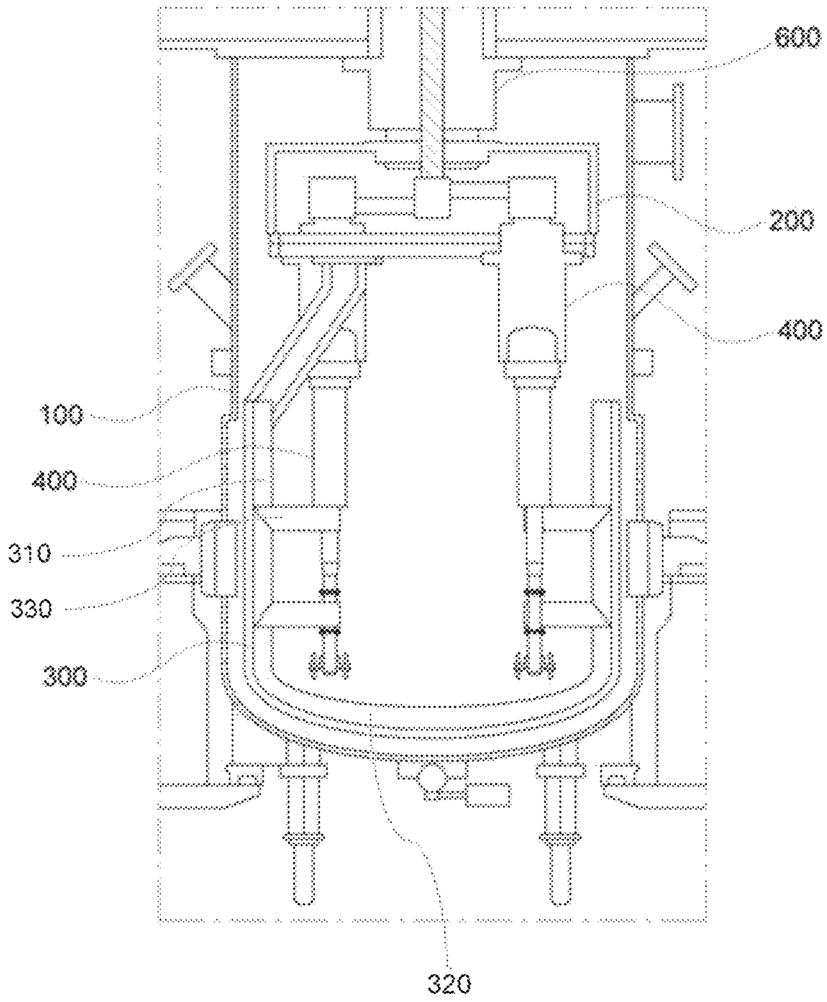
FIG. 2 is a diagram showing a high-speed blade of an ultra-dispersion mixer according to the present disclosure.

As shown in FIG. 2, a power distributor 600 for distributing one or more powers transferred from a plurality of power sources 10*a* 10*b* may be insertion-installed to penetrate the upper portion of the chamber 100 and the center of the blade drum 200 to allow the blade drum 200 to rotate inside the chamber 100 of the ultra-dispersion mixer 1000 according to the present disclosure. In this case, the low-speed blade 300 and the high-speed blade 400 that are disposed at the blade drum 200 will be described in detail below.

The low-speed blade 300 may have one end connected to a lower surface of the blade drum 200 and the other end that extends along the internal wall of the chamber 100 and may rotate along the internal wall of the chamber 100 together with the blade drum 200. In this case, the low-speed blade 300 may include a rod portion 310, a bottom portion 320, and a protrusion 330.

The rod portion 310 may extend along the internal wall of the chamber 100 from the blade drum 200 and may stir the mixed material agglomerated on the internal wall of the chamber 100 to the center of the chamber 100.

The bottom portion 320 may extend along a bottom surface of the chamber 100 from an end of the rod portion 310 and may stir the mixed material agglomerated on the bottom surface of the chamber.

As shown in FIG. 2, the protrusion 330 may protrude in a direction towards an internal side of the chamber 100 from the rod portion 310 and may perform a function of evenly transferring the mixed material oriented toward the high-speed blade 400 in the chamber 100 to the high-speed blade 400.

The high-speed blade 400 may be arranged at a plurality of positions on the blade drum 200, in which case at least one high-speed blade may be arranged before and behind the low-speed blade 300. In this case, the high-speed blade 400 may be arranged in a region to prevent a plurality of blade parts having different stirring characteristics arranged on the high-speed blade 400 from interfering with the low-speed blade 300 during shaft rotation. Furthermore, the blade parts arranged on the high-speed blade 400 may be disposed between the protrusions 330 and may evenly supply the mixed material towards the high-speed blade 400 through rotation of the blade drum 200.

Figure 3A:
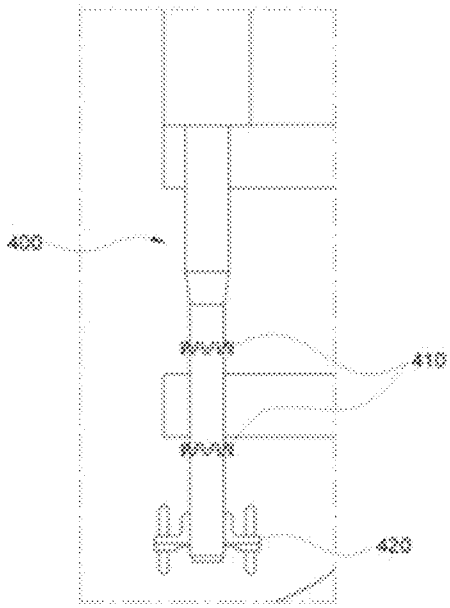
FIGS. 3A and 3B are diagrams showing blade parts of an ultra-dispersion mixer according to the present disclosure.
Figure 3B:
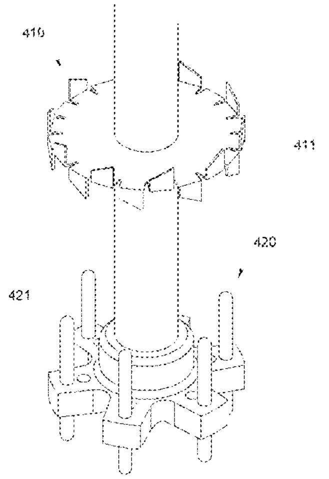

As shown in FIGS. 3A and 3B, blade parts may be arranged on the high-speed blade 400 of the ultra-dispersion mixer 1000 according to the present disclosure, and the blade parts will be described with reference to FIG. 3A. As shown in FIG. 3A, the high-speed blade 400 may use together a saw blade 410 and a star blade 420 having different stirring characteristics. Thus, the saw blade 410 may stir and tear powder agglomerates formed while the powders and the binder solution are mixed in the chamber 100, and the star blade 420 may stir the overall mixed material inside the chamber 100 in order to prevent the mixed material inside the chamber 100 from being fixed. As shown in FIG. 3B, the saw blade 410 may have saw blade parts 411 formed on an end of a circular plate and may supply dispersion force to tear a particle of the mixed material or the powder agglomerates inside the chamber 100. Furthermore, the star blade 420 may have rods 421 formed at ends of bodies that are formed like a circular plate or are radially arranged and may supply dispersion force to mix the overall mixed material flowing inside the chamber 100. Needless to say, the saw blade 410 and the star blade 420 may have other shapes for achieving the same effect as the shapes shown in FIGS. 3A and 3B.

Figure 4:
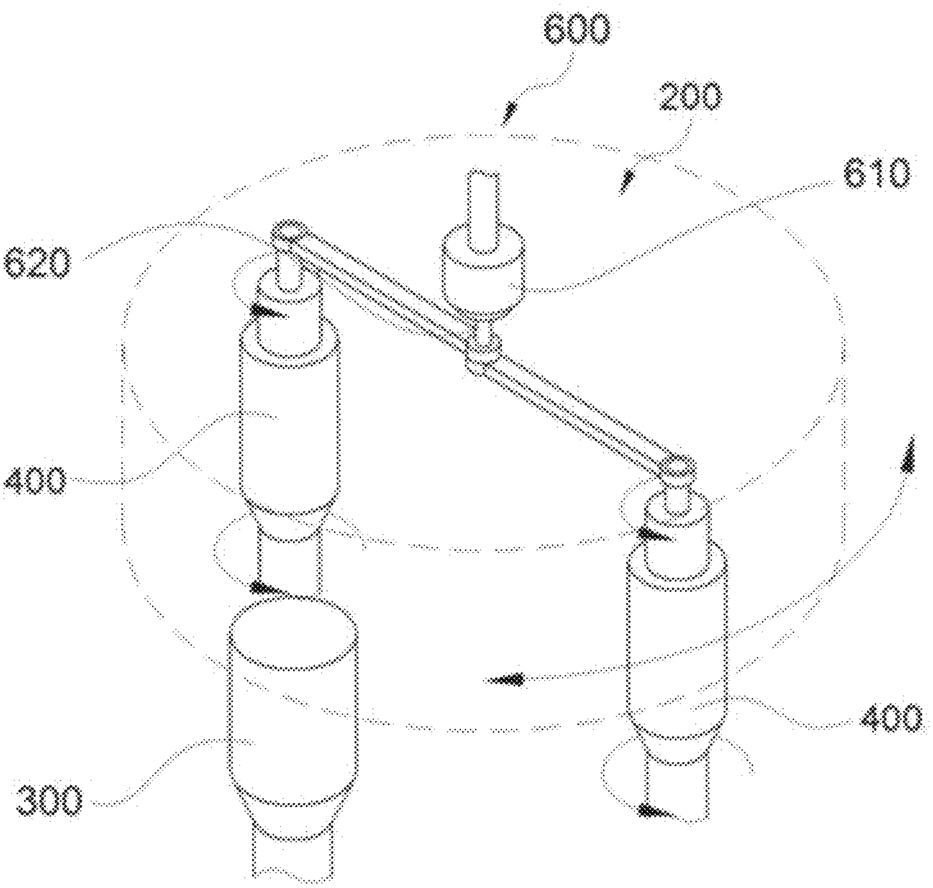
FIG. 4 is a diagram showing a blade drum of an ultra-dispersion mixer according to the present disclosure.

As shown in FIG. 4, the ultra-dispersion mixer 1000 according to the present disclosure may distribute a plurality of powers transferred from the outside to the low-speed blade 300 and the high-speed blade 400 through the power distributor 600 insertion-installed into the blade drum 200. Hereinafter, a detailed shape of the blade drum 200 and a method of distributing power will be described.

The power distributor 600 may be insertion-installed to penetrate the upper portion of the chamber 100 and the center of the blade drum 200 and may distribute a plurality of powers transferred from the outside to the blade drum 200 or the high-speed blade 400. In detail, the power distributor 600 may include a first distributor 610 and a second distributor 620. The first distributor 610 may be formed with a hollow center and may distribute any one of a plurality of supplied powers to the blade drum. The second distributor 620 may be formed as a rotation shaft penetrating the center of the first distributor 610 and may distribute the other power of the supplied powers to one or more high-speed blades 400.

Figure 5:
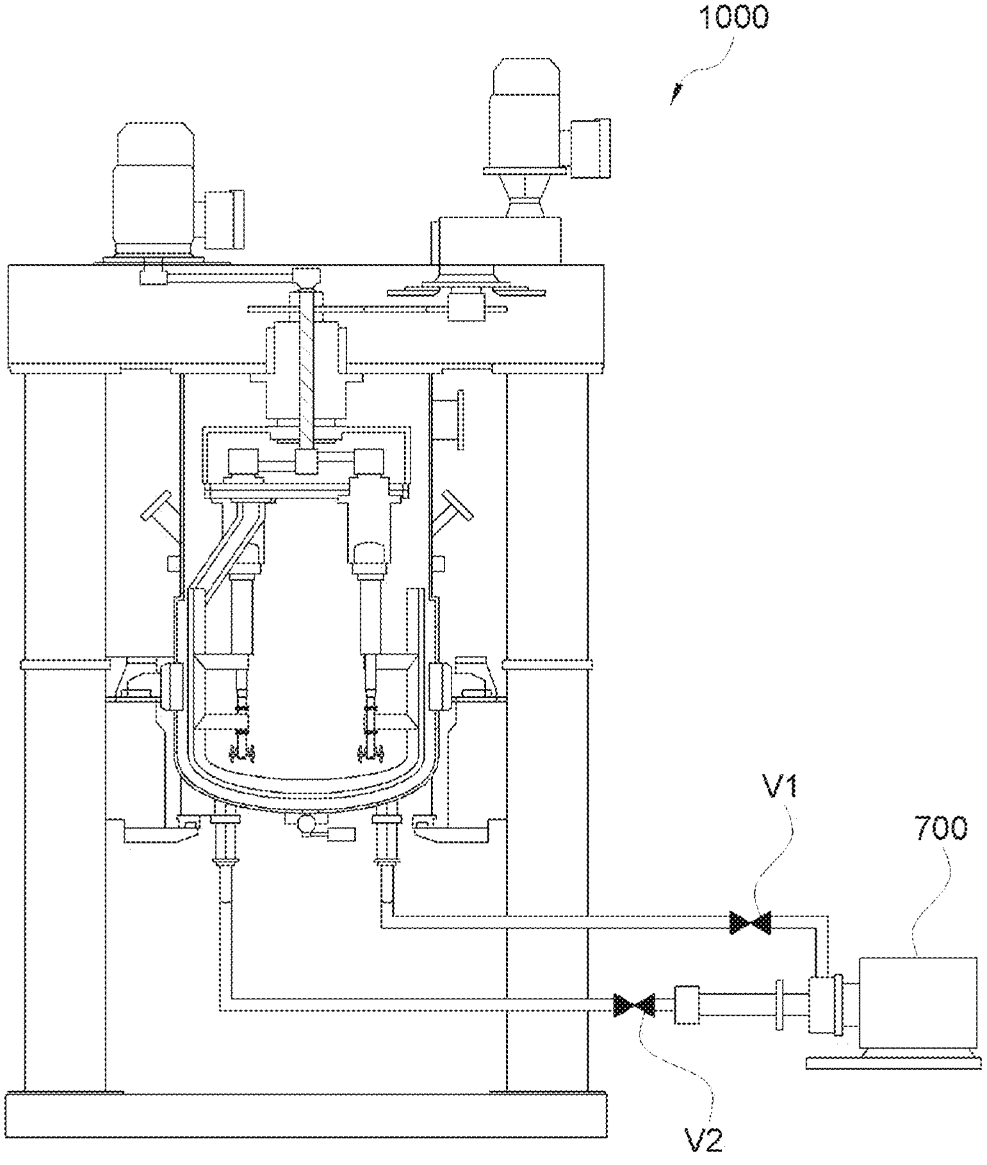
FIG. 5 is a diagram showing an ultra-dispersion mixer according to an embodiment of the present disclosure.

As shown in FIG. 5, the ultra-dispersion mixer 1000 according to the present disclosure may include a high-shear disperser 700. Hereinafter, the configuration of the ultra-dispersion mixer 1000 including the high-shear disperser 700 will be described.

The high-shear disperser 700 may stir the mixed material introduced from the chamber 100 by supplying high-shear dispersion force to the mixed material using rotation force of an impeller included therein and supplying shear force to particles of the mixed material, which are not dispersed in the low-speed blade 300 and the high-speed blade 400. Accordingly, an inlet and an outlet through which the mixed material flows may be formed in a lower portion of the chamber 100, and thus a predetermined amount of the mixed material stirred in the chamber 100 may be stirred in the high-shear disperser 700 and may then circulate again in the chamber 100, thereby rapidly producing a high-quality slurry for a secondary battery. Furthermore, at the beginning of stirring in which a powder and a solution are mixed as a mixed material, it may be difficult to operate the high-shear disperser 700 due to the powder agglomerates, and accordingly the mixed material inside the chamber 100 may achieve dispersion within a range for operating the high-shear disperser 700 and may then circulate in the chamber 100 and the high-shear disperser 700, thereby preparing a slurry for a secondary battery having high dispersion. In addition, a timing valve may be disposed at the inlet and the outlet to which the high-shear disperser 700 and the chamber 100 are connected and may also control supply of the mixed material.

Figure 6:
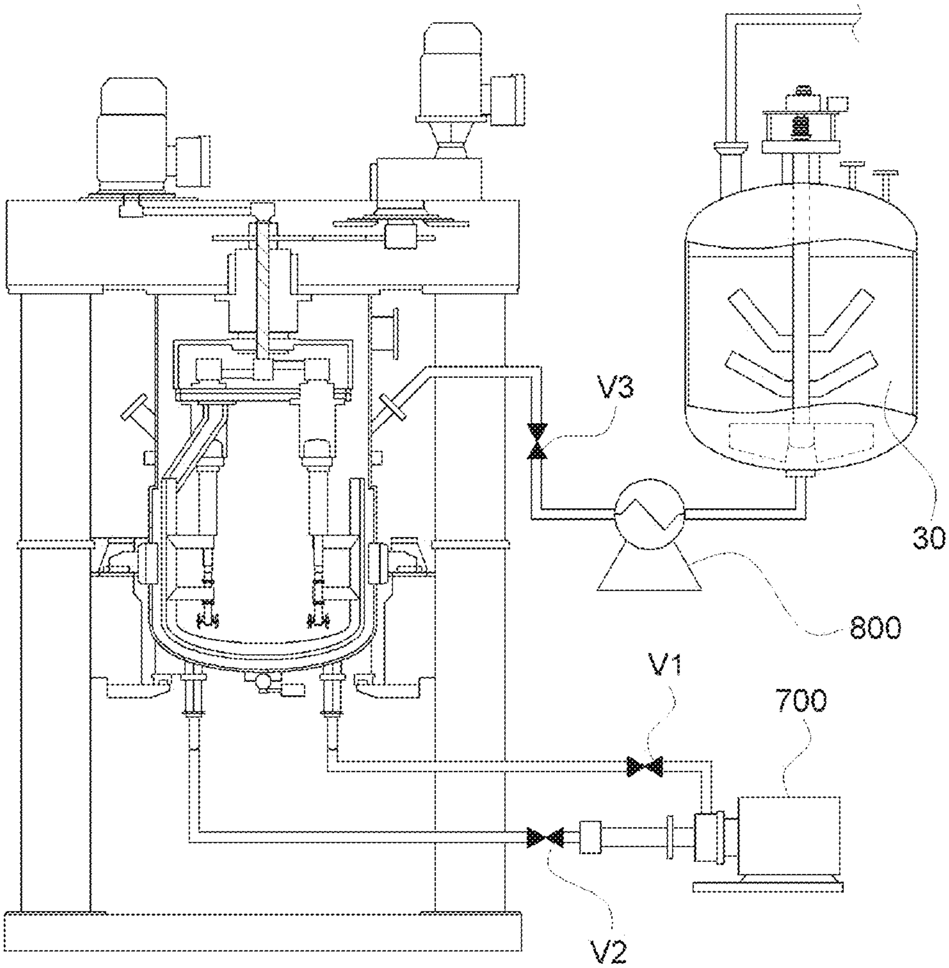
FIG. 6 is a diagram showing an ultra-dispersion mixer according to another embodiment of the present disclosure.

As shown in FIG. 6, the ultra-dispersion mixer 1000 according to the present disclosure may include a heat exchanger 800 to adjust the temperature of a solution supplied thereto. Hereinafter, the configuration of the ultra-dispersion mixer 1000 including the heat exchanger 800 will be described.

The heat exchanger 800 may perform a function of controlling the temperature of the solution supplied to the chamber 100. In detail, the mixed material including the powders and solution supplied to the chamber 100 may be agglomerated rather than being rapidly stirred due to high viscosity and low temperature at the beginning of stirring, and thus the heat exchanger 800 may be operated to increase the temperature of the solution until stirring inside the chamber 100 is continuously performed for a predetermined time and the mixed material is maintained at a temperature equal to or greater than a predetermined temperature for easy stirring.

As shown in FIGS. 5 and 6, according to an embodiment, the ultra-dispersion mixer 1000 according to the present disclosure may further include the high-shear disperser 700 and the heat exchanger 800 other than the components of the chamber 100 in which the mixed material is stirred, and a high-quality slurry for an electrode of a secondary battery may be prepared by rapidly stirring the mixed material, and to this end, valves V1, V2, V3, and V4 may be arranged on flow channels of the high-shear disperser 700 and the heat exchanger 800 which are connected to the chamber 100 to control a feed rate.

The ultra-dispersion mixer 1000 may further include a powder feeder 20 configured to supply powders to the chamber 100, a solution feeder 30 configured to supply a solution to the chamber 100, and the heat exchanger 800 configured to adjust a temperature of the solution supplied to the solution feeder 30.

Since the ultra-dispersion mixer according to the present disclosure as configured above includes a plurality of stirring devices having various stirring characteristics, the ultra-dispersion mixer may change a stirring environment inside the mixer depending on the type of a material supplied to the mixer and a stirring degree of a mixed material during a procedure of preparing a slurry for a secondary battery, and accordingly the mixed material may be stirred to prepare the slurry for a secondary battery having high dispersion, thereby producing a high-quality slurry for a secondary battery for reducing the preparing costs and stirring time.

Exemplary embodiments of the present disclosure can be variously changed and embodied in various forms, in which illustrative embodiments of the present disclosure are shown. However, exemplary embodiments of the present disclosure should not be construed as being limited to the embodiments set forth herein and any changes, equivalents, or alternatives which are within the spirit and scope of the present disclosure should be understood as falling within the scope of the present disclosure.

It will be understood that when an element is referred to as being "connected to", or "coupled to" another element, it may be directly on, connected to, or coupled to the other element, or intervening elements may be present.

Unless otherwise defined, all terms including technical and scientific terms used herein have the same meaning as commonly understood by one of ordinary skill in the art to which this present disclosure belongs.

It will be further understood that terms, such as those defined in commonly used dictionaries, should be interpreted as having meanings that are consistent with their meanings in the context of the relevant art and will not be interpreted in an idealized or overly formal sense unless expressly so defined herein.

It will be understood by those of ordinary skill in the art that the present disclosure is not limited to the above embodiments and various changes in form and details may be made therein without departing from the spirit and scope of the present disclosure as defined by the following claims.

What is claimed is:

1. An ultra-dispersion mixer comprising:

a chamber configured to accommodate a mixed material therein;

a blade drum formed as a cylinder having a space formed therein and disposed to rotate at an upper portion of an internal side of the chamber;

a low-speed blade having one end connected to a lower surface of the blade drum and a remaining end that extends along an internal sidewall of the chamber and rotates together with the blade drum along the internal sidewall of the chamber; and at least one high-speed blade having one end connected to the blade drum and a remaining end that extends towards the internal side of the chamber and rotating on the blade drum, wherein the at least one high-speed blade has a plurality of blade parts having different stirring characteristics and arranged on one shaft, wherein the low-speed blade includes a rod portion extending along an internal surface of the chamber, wherein one end of the rod portion of the low-speed blade is connected to the lower surface of the blade drum by means of an inclined portion, wherein the low-speed blade includes:

a bottom portion extending along a bottom surface of the chamber; and a plurality of protrusions that protrude towards the internal side of the chamber from the rod portion and are spaced apart from each other, wherein the blade parts are arranged between the plurality of protrusions that are spaced apart from each other, wherein the bottom portion of the low-speed blade extends along the bottom surface of the chamber from an end of the rod portion, and wherein the remaining end is a free end disposed on a side of the chamber opposite the rod portion.

2. The ultra-dispersion mixer of claim 1, wherein the blade parts include:

a saw blade that has a sawtooth protruding outside a circular plate and rotates; and a star blade that has a plurality of rods vertically extending outside a circular plate and rotates.

3. The ultra-dispersion mixer of claim 1, further comprising:

a power distributor inserted passing through an upper portion of the chamber and a center of the blade drum, wherein the power distributor includes a first distributor configured to distribute a first portion of a power transferred from a plurality of power sources to the blade drum, and a second distributor formed as a rotation shaft penetrating a center of the first distributor and configured to distribute a second remaining portion of the power transferred from the plurality of power sources to the high-speed blade, wherein the low-speed blade rotates together with the blade drum, and wherein the high-speed blade rotates on the blade drum.

4. The ultra-dispersion mixer of claim 1, wherein the high-speed blade rotates at a higher speed than a revolution speed of the low-speed blade.

5. The ultra-dispersion mixer of claim 1, further comprising:

an opening and closing device disposed at opposite sides of the chamber to rotate the chamber and raise and lower the chamber on a support on which the chamber is disposed.

6. The ultra-dispersion mixer of claim 1, further comprising:

a powder feeder configured to supply at least one powder to the chamber;

a solution feeder configured to supply a solution to the chamber; and a heat exchanger configured to adjust a temperature of the solution supplied to the solution feeder.

7. The ultra-dispersion mixer of claim 1, further comprising:

a high-shear disperser configured to supply high-shear dispersion force to a mixed material introduced from the chamber using a rotational force of an impeller included in the ultra-dispersion mixer, wherein an inlet and an outlet that are formed in a lower portion of the chamber are connected to the high-shear disperser.

8. The ultra-dispersion mixer of claim 7, wherein the inlet and the outlet include timing valves formed thereon, which are opened and closed after the mixed material is stirred in the chamber during a user set time or greater.

9. An energy efficient system comprising the ultra-dispersion mixer of claim 1.

10. The energy efficient system of claim 9 employed in an energy efficient industrial process for obtaining a homogeneous dispersion of one solid material within another solid or liquid material.

11. The energy efficient system of claim 9 employed in mixing at least one active pharmaceutical ingredient within at least one excipient to produce a homogeneous suspension or emulsion thereof.

12. The energy efficient system of claim 9 employed in a chemical manufacturing process for mixing at least one powder within a liquid to produce a homogeneous suspension or emulsion thereof.

* * * * *